(12) United States Patent
Huang et al.

(10) Patent No.: US 9,842,585 B2
(45) Date of Patent: Dec. 12, 2017

(54) MULTILINGUAL DEEP NEURAL NETWORK

(71) Applicant: Microsoft Corporation, Redmond, WA (US)

(72) Inventors: Jui-Ting Huang, Fremont, CA (US); Jinyu Li, Redmond, WA (US); Dong Yu, Bothell, WA (US); Li Deng, Redmond, WA (US); Yifan Gong, Sammammish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 13/792,241

(22) Filed: Mar. 11, 2013

(65) Prior Publication Data

US 2014/0257805 A1  Sep. 11, 2014

(51) Int. Cl.
G10L 15/16 (2006.01)
G10L 15/06 (2013.01)
G06N 3/04 (2006.01)
G06N 3/08 (2006.01)

(52) U.S. Cl.
CPC .......... *G10L 15/063* (2013.01); *G06N 3/0454* (2013.01); *G06N 3/084* (2013.01); *G10L 15/16* (2013.01)

(58) Field of Classification Search
None
See application file for complete search history.

(56) References Cited

U.S. PATENT DOCUMENTS

| 6,128,609 | A | 10/2000 | Rose |
| 7,043,431 | B2 | 5/2006 | Riis et al. |
| 7,089,217 | B2 | 8/2006 | Kasabov |
| 9,378,733 | B1 * | 6/2016 | Vanhoucke ............. G10L 15/02 |
| 2004/0039570 | A1 * | 2/2004 | Harengel ................ G10L 13/08 704/232 |
| 2004/0210438 | A1 * | 10/2004 | Gillick .................. G10L 15/005 704/254 |
| 2009/0210218 | A1 | 8/2009 | Collobert et al. |

(Continued)

OTHER PUBLICATIONS

[Pawel Swietojanski,Arnab Ghoshal,Steve Renals], Unsupervised cross-lingual knowledge transfer in DNN-based LVCSR, Date: [This paper appears in: Spoken Language Technology Workshop (SLT), 2012 IEEE, Issue date: Dec. 2-5, 2012] Pertinent pages: All URL: http://ieeexplore.ieee.org/xpls/icp.jsp?arnumber=6424230 &tag=1.*

(Continued)

*Primary Examiner* — Richa Mishra
(74) *Attorney, Agent, or Firm* — Medley, Behrens & Lewis, LLC

(57) ABSTRACT

Described herein are various technologies pertaining to a multilingual deep neural network (MDNN). The MDNN includes a plurality of hidden layers, wherein values for weight parameters of the plurality of hidden layers are learned during a training phase based upon training data in terms of acoustic raw features for multiple languages. The MDNN further includes softmax layers that are trained for each target language separately, making use of the hidden layer values trained jointly with multiple source languages. The MDNN is adaptable, such that a new softmax layer may be added on top of the existing hidden layers, where the new softmax layer corresponds to a new target language.

20 Claims, 10 Drawing Sheets

(56) References Cited

U.S. PATENT DOCUMENTS

| | | | | |
|---|---|---|---|---|
| 2009/0326945 | A1* | 12/2009 | Tian | G10L 15/005 704/254 |
| 2012/0065976 | A1 | 3/2012 | Deng et al. | |
| 2012/0072215 | A1 | 3/2012 | Yu et al. | |
| 2012/0254086 | A1 | 10/2012 | Deng et al. | |
| 2014/0156575 | A1* | 6/2014 | Sainath | G06N 7/005 706/16 |
| 2014/0164299 | A1* | 6/2014 | Sainath | G06N 3/08 706/16 |

OTHER PUBLICATIONS

[L 'aszl'o T'oth1, Joe Frankel2, G'abor Gosztolya1, Simon King]; Cross-lingual Portability of MLP-Based Tandem Features—A Case Study for English and Hungarian; Date : 2008; Pertinent pages: All URL: http://www.cstr.ed.ac.uk/downloads/publications/2008/IS080729.PDF.*
[Samuel Thomas, Sriram Ganapathy and Hynek Hermansky]; Multilingual MLP Features for Low-Resource LVCSR Systems; Date: retrieved from Google as 2012; http://www.clsp.jhu.edu/~samuel/pdfs/multilingual.pdf.*
Pawel Swietojanski,Arnab Ghoshal,Steve Renals], Unsupervised cross-lingual knowledge transfer in DNN-based LVCSR, Date: [This paper appears in: Spoken Language Technology Workshop (SLT), 2012 IEEE, Issue Date: Dec. 2-5, 2012] Pertinent pages; All URL: http://ieeexplore.ieee.org/xpls/icp.jsp?arnumber=6424230&tag=1.*
[L'aszl'o T'oth1, Joes Frankel2, G'abor Gosztolya1, Simon King]; Cross-lingual Portability of MLP-Based Tandem Features—A Case Study for English and Hungarian; Date : 2008; Pertinent pages: All URL: http://www.cstr.ed.ac.uk/downloads/publications/2008/IS080729.PDF.*
"Robust Features for Multilingual Acoustic Modeling", Retrieved at <<http://shodhganga.inflibnet.ac.in/bitstream/10603/2356/14/14_chapter%204.pdf>>, Retrieved Date: Jan. 30, 2013, pp. 1-25.
Bourlard, et al., "Current Trends in Multilingual Speech Processing", Retrieved at <<http://www.ias.ac.in/sadhana/Pdf2011Oct/885.pdf>>, In Sadhana—Journal of the Indian Academy of Sciences, vol. 36, Issue 5, Oct. 2011, pp. 1-31.
Dahl, et al., "Context-Dependent Pre-Trained Deep Neural Networks for Large Vocabulary Speech Recognition", Retrieved at <<http://citeseerx.ist.psu.edu/viewdoc/download;jsessionid=C731D21FC0BBC77717D02500CB795980?doi=10.1.1.227.8990&rep=rep1&type=pdf>>, In IEEE Transactions on Audio, Speech, and Language Processing, Special Issue on Deep Learning for Speech and Langauge Processing, Jan. 2012, pp. 1-13.
Seide, et al., "Conversational Speech Transcription using Context-Dependent Deep Neural Networks", Retrieved at <<http://research.microsoft.com/pubs/153169/CD-DNN-HMM-SWB-Interspeech2011-Pub.pdf>>, In 12th Annual Conference of the International Speech Communication Association, Aug. 2011, pp. 1-4.
Seide, et al., "Feature Engineering in Context-Dependent Deep Neural Networks for Conversational Speech Transcription", Retrieved at <<http://research.microsoft.com/pubs/157341/featureengineeringcd-dnn-asru2011-pub.pdf>>, In IEEE Workshop on Automatic Speech Recognition & Understanding, Dec. 11, 2011, pp. 1-6.
Mohamed, et al., "Acoustic Modeling using Deep Belief Networks", Retrieved at <<http://www.cs.toronto.edu/~hinton/absps/speechDBN_jrnl.pdf>>, In IEEE Transactions on Audio, Speech and Language Processing, vol. 20, Issue 1, Jan. 2012, pp. 1-10.
Jaitly, et al., "Application of Pretrained Deep Neural Networks to Large Vocabulary Speech Recognition", Retrieved at <<http://www.cs.toronto.edu/~ndjaitly/techrep.pdf>>, In UTML TR 2012-001, Mar. 12, 2012, pp. 1-11.
Sainath, et al., "Making Deep Belief Networks Effective for Large Vocabulary Continuous Speech Recognition", Retrieved at <<http://citeseerx.ist.psu.edu/viewdoc/download?doi=10.1.1.224.860&rep=rep1&type=pdf>>, In the IEEE Workshop on Automatic Speech Recognition and Understanding, Dec. 2011, pp. 1-6.
Kingsbury, et al., "Scalable Minimum Bayes Risk Training of Deep Neural Network Acoustic Models using Distributed Hessian-Free Optimization", In 13th Annual Conference of the International Speech Communication Association, Sep. 9, 2012, pp. 1-4.
Hinton, et al., "Deep Neural Networks for Acoustic Modeling in Speech Recognition", Retrieved at <<http://psych.stanford.edu/~jlm/pdfs/Hinton12IEEE_SignalProcessingMagazine.pdf>>, In the IEEE Signal Processing Magazine, Nov. 2012, pp. 1-27.
Caruana, Rich., "Multitask Learning", Retrieved at <<http://gogoshen.org/ml/Research%20Paper%20Library/caruana97multitask2.pdf>>, In Thesis, Sep. 23, 1997, pp. 1-255.
Le, et al., "Building High-Level Features using Large Scale Unsupervised Learning", Retrieved at <<http://arxiv.org/pdf/1112.6209.pdf>>, In Proceedings of the 29th International Conference on Machine Learning, Jul. 2012, pp. 1-11.
Swietojanski, et al., "Unsupervised Cross-Lingual Knowledge Transfer in DNN-based LVCSR", Retrieved at <<http://www.cstr.ed.ac.uk/downloads/publications/2012/ps_slt2012.pdf>>, In IEEE Workshop on Spoken Language Technology, Dec. 2, 2012, pp. 1-6.
Schultz, et al., "Language Independent and Language Adaptive Acoustic Modeling for Speech Recognition", Retrieved at <<http://www.cs.cmu.edu/~tanja/Papers/SchultzSpecomOrigPublication.pdf>>, In Journal of Speech Communication, vol. 35, Aug. 2001, pp. 1-21.
Lin, et al., "A Study on Multilingual Acoustic Modeling for Large Vocabulary ASR", Retrieved at <<http://melodi.ee.washington.edu/~hlin/papers/icassp09_multilingual.pdf>>, In International Conference on Acoustics, Speech and Signal Processing, Apr. 2009, pp. 1-4.
Yu, et al., "Cross-Lingual Speech Recognition under Runtime Resource Constraints", Retrieved at <<http://research.microsoft.com/pubs/78258/Cross-Lingual-ICASSP2009.pdf>>, In International Conference on Acoustics, Speech and Signal Processing, Apr. 2009, pp. 1-4.
Burget, et al., "Multilingual Acoustic Modeling for Speech Recognition Based on Subspace Gaussian Mixture Models", Retrieved at <<http://research.microsoft.com/pubs/118814/icassp10_multiling.pdf>>, In International Conference on Acoustics, Speech and Signal Processing, Mar. 14, 2010, pp. 1-4.
Stolcke, et al., "Cross-Domain and Cross-Language Portability of Acoustic Features Estimated by Multilayer Perceptrons", Retrieved at <<http:ieeexplore.ieee.org/stamp/stamp.jsp?tp=&arnumber=1660022>>, In IEEE International Conference on Acoustics, Speech and Signal Processing, May 15, 2006, pp. 1-4.
Thomas, et al., "Cross-lingual and Multi-stream Posterior Features for Low Resource LVCSR Systems", Retrieved at <<http://old-site.clsp.jhu.edu/people/samuel/pdfs/tandem_low_resource.pdf>>, In 11th Annual Conference of the International Speech Communication Association, Sep. 26, 2010, pp. 1-4.
Plahl, et al., "Cross-Lingual Portability of Chinese and English Neural Network Features for French and German LVCSR", Retrieved at http://www-i6.informatik.rwth-aachen.de/publications/download/766/Plahl-ASRU-2011.pdf>>, In IEEE Workshop on Automatic Speech Recognition and Understanding, Dec. 11, 2011, pp. 1-6.
Vu, et al., "An Investigation on Initialization Schemes for Multilayer Perceptron Training Using Multilingual Data and their Effect on ASR Performance", Retrieved at <<http://csl.ira.uka.de/~thangvu/paper/vu_mlp_interspeech2012.pdf>>, In 13th Annual Conference of the International Speech Communication Association, Sep. 9, 2012, pp. 1-4.
Thomas, et al., "Multilingual MLP Features for Low-Resource LVCSR Systems", Retrieved at <<http://old-site.clsp.jhu.edu/~samuel/pdfs/multilingual.pdf>>, In International Conference on Acoustics, Speech and Signal Processing, Mar. 25, 2012, pp. 1-4.
Collobert, et al., "A Unified Architecture for Natural Language Processing: Deep Neural Networks with Multitask Learning", Retrieved at <<http://ronan.collobert.com/pub/matos/2008_nlp_icml.pdf>>, In Proceedings of the 25th International Conference on Machine Learning, Jul. 5, 2008, pp. 1-8.

(56) References Cited

OTHER PUBLICATIONS

Yu, et al., "Roles of Pretrained and Fine-Tuning in Context-Dependent DNN-HMMs for Real-World Speech Recognition", in Proc. NIPS Workshop on Deep Learning and Unsupervised Feature Learning, Dec. 2010, pp. 1-8.
"International Search Report & Written Opinion for PCT Patent Application No. PCT/US2014/020448", dated Jul. 17, 2014, Filed Date: Mar. 5, 2014, 15 Pages.
Vu, et al., "Multilingual Bottle-Neck Features and Its Application for Under-resourced languages", In the Third Workshop on Spoken Language Technologies for Under-resourced LAnguages, May 7, 2012, 4 Pages.
Toth, et al., "Cross-lingual Portability of MLP-Based Tandem Features—A Case Study for English and Hungarian", In Proceedings of Interspeech, Sep. 22, 2008, pp. 2695-2698.
Ngiam, et al., "Multimodal Deep Learning", In Proceedings of the 28th International Conference on Machine Learning, Jun. 28, 2011, 8 Pages.
"Written Opinion for PCT Patent Application No. PCT/US2014/020448", Filed Date: Feb. 3, 2015, 7 pages.
U.S. Appl. No. 13/304,643, filed Nov. 26, 2011, Yu, et al.
U.S. Appl. No. 13/682,372, filed Nov. 20, 2012, Seide, et al.

\* cited by examiner

MULTILINGUAL DEEP NEURAL NETWORK

BACKGROUND

Computer-implemented recognition systems have been designed to perform a variety of recognition tasks. Such tasks include analysis of a video signal to identify humans captured in such signal, analysis of a video signal to identify a gesture performed by a human, analysis of a video signal to recognize an object therein, analysis of a handwriting sample to identify characters included in the handwriting sample, analysis of an audio signal to determine an identity of a speaker captured in the audio signal, analysis of an audio signal to recognize spoken words, analysis of an audio signal to recognize a language of a speaker in the audio signal, analysis of an audio signal to recognize an accent/dialect of a speaker in the audio signal, amongst other tasks.

With respect to automatic speech recognition (ASR) systems, such systems are becoming increasingly ubiquitous. For example, mobile telephones are currently equipped with ASR systems that are configured to recognize spoken commands set forth by users thereof, thus allowing users to perform other tasks while setting forth voice commands to mobile telephones. Gaming consoles have also been equipped with ASR systems that are likewise configured to recognize certain spoken commands, thereby allowing users of such gaming consoles to interact with the gaming consoles without requiring use of a handheld game controller. Still further, customer service centers accessible by telephone employ relatively robust ASR systems to assist users in connection with obtaining desired information. Accordingly, a user can access a customer service center by telephone and set forth one or more voice commands to obtain desired information (or to be directed to an operator that can assist the user in obtaining the information).

It is understood that performance of an ASR system is dependent upon an amount of labeled training data available for training the ASR system. For many languages, there is a relatively small amount of labeled training data currently available for training an ASR system, while for other languages there is a relatively large amount of training data for training an ASR system. Therefore, for certain languages, ASR systems are relatively poorly trained and thus inaccurate, and have difficulties with respect to large vocabulary speech recognition (LVSR) tasks.

SUMMARY

The following is a brief summary of subject matter that is described in greater detail herein. This summary is not intended to be limiting as to the scope of the claims.

Described herein are various technologies pertaining to automatic speech recognition (ASR) systems that are trained using multilingual training data. With more specificity, an ASR system can include a deep neural network (DNN), wherein the DNN includes an input layer that receives a feature vector extracted from a captured utterance in a first language. The DNN also includes a plurality of hidden layers, wherein each hidden layer in the plurality of hidden layers comprises a respective plurality of nodes. Each node in a hidden layer is configured to perform a linear or nonlinear transformation on its respective input, wherein the input is based upon output of nodes in a layer immediately beneath the hidden layer. That is, hidden layers in the plurality of hidden layers are stacked one on top of another, such that input to a node in a hidden layer is based upon output of a node in a layer immediately beneath such hidden layer.

The hidden layers have several parameters associated therewith, such as weights between nodes in separate layers, wherein the weights represent the synaptic strength, as well as weight biases. Values of such weight parameters, in an exemplary embodiment, can be learned based upon multilingual training data (simultaneously across languages represented in the multilingual training data). The DNN further comprises at least one softmax layer that is configured to output a probability distribution over modeling units that are representative of phonetic elements used in a target language. For instance, such phonetic units can be senones (tied triphone or quintone states in a hidden Markov model). In an exemplary embodiment, the DNN can include non-hierarchical multiple softmax layers, one softmax layer for each language that is desirably subject to recognition by the ASR system. In another embodiment, the DNN may include a single softmax layer, wherein synapses of the softmax layer are selectively activated and deactivated depending upon the language of the captured utterance. Yet in other embodiments, the DNN may include a single softmax layer to represent a shared phonetic symbol set across multiple languages.

Hidden layers of the DNN, with parameter values learned based upon multi-lingual training data, may be reused (shared) to allow for the recognition system to perform recognition tasks with respect to different languages. For instance, for a new target language where there is not a significant amount of training data, the plurality of hidden layers (with parameter values learned based upon multilingual (source) training data without the target language) can be reused, and a softmax layer for the target language can be added to the DNN (with parameters of the softmax layer learned based upon available training data for the target language). The modified DNN allows for improved recognition relative to a DNN (or other type of model used in ASR systems) trained based solely upon the training data in the target language. In other embodiments, if there is a relatively large amount of training data available for the target language (e.g., nine hours or more), the entire model can be tuned based upon such training data in the target language (rather than just the softmax layer being added to the DNN). In such an embodiment, the target language may also be a source language.

After being trained, the ASR system can be employed to recognize speech of multiple languages, so long as acoustic data in each language in the multiple languages had been used to train at least one softmax layer of the DNN. By sharing the hidden layers in the DNN and using the joint training strategy described above, recognition accuracy across all languages decodable by the DNN can be improved over monolingual ASR systems trained using the acoustic (training) data from each of the individual languages alone.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
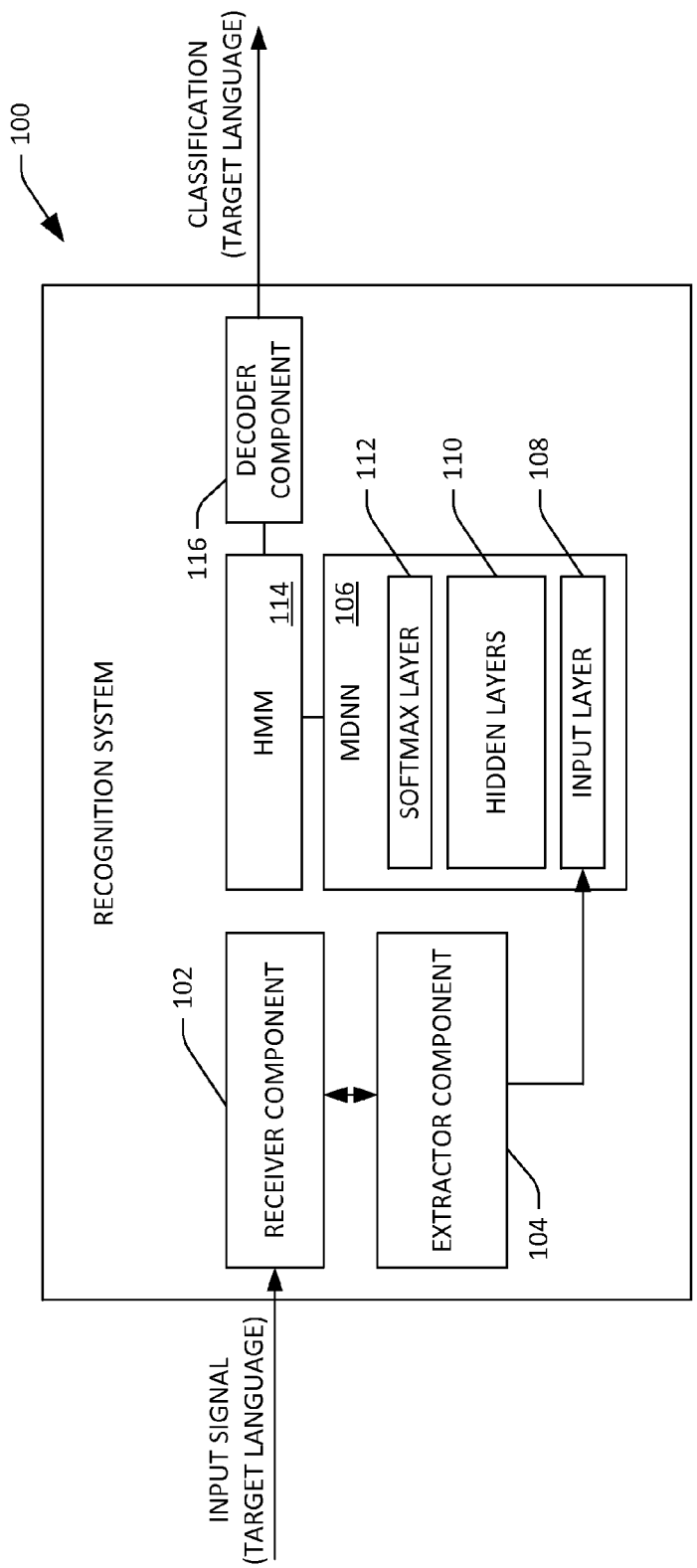
FIG. 1 is a functional block diagram of an exemplary recognition system that includes a shared hidden layer multilingual deep neural network (SHL-MDNN).

Various technologies pertaining to training a deep neural network (DNN) utilizing multilingual training data, as well as performing a recognition task through utilization of a DNN trained with multilingual training data, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary recognition system 100 that can be employed to recognize spoken words in multiple different languages is illustrated. The recognition system 100 may be comprised by any suitable computing device, including but not limited to a desktop computing device, a mobile computing device, such as a mobile telephone, a portable media player, a tablet (slate) computing device, a laptop computing device, or the like. In other embodiments, the recognition system 100 may be included in a server or distributed across servers such that the recognition system 100 is accessible by way of a network connection (e.g., a user employs a mobile computing device to contact a customer service center). The examples set forth herein describe the recognition system 100 as being an automatic speech recognition (ASR) system. It is to be understood, however, that the recognition system 100 may be employed to perform other types of recognition tasks. For instance, the recognition system 100 may be utilized to perform semantic tagging, wherein semantic meaning of input text can be ascertained.

In an exemplary embodiment, the recognition system 100 can be configured to recognize words in multiple languages, wherein the multiple languages include a target language. The recognition system 100 comprises a receiver component 102 that receives an input signal (an acoustic signal), wherein the input signal comprises a spoken utterance, the spoken utterance including a word set forth in the target language.

The recognition system 100 further comprises an extractor component 104 that extracts features from the input signal received by the receiver component 102, thereby generating a feature vector for at least one frame of the input signal. Features extracted by the extractor component 104, for instance, may be Mel-frequency cepstral coefficients (MFCCs), perceptual linear prediction (PLP) features, log filter bank features, etc.

The recognition system 100 additionally comprises a multilingual deep neural network (MDNN) 106. As will be described in greater detail below, at least a portion of the MDNN 106 may be trained through utilization of multilingual training data, wherein languages in the multilingual training data are referred to herein as "source languages." Thus, a "target language" is a language where words spoken therein are desirably recognized by the recognition system 100, and a "source" language is a language included in training data that is used to train the MDNN 106. It can thus be ascertained that a language, in some embodiments, may be both a source language and a target language. The MDNN 106 includes an input layer 108 that receives the feature vector extracted from the at least one frame of the input signal by the extractor component 104. In an exemplary embodiment, the MDNN 106 may be a context-dependent MDNN, wherein the input layer 108 is configured to receive feature vectors for numerous frames, thus providing context for a particular frame of interest.

The MDNN 106 additionally includes a plurality of hidden layers 110, wherein a number of hidden layers in the plurality of hidden layers 110 can be at least three hidden layers. Additionally, the number of hidden layers may be up to one hundred hidden layers. Hidden layers in the plurality of hidden layers 110 are stacked one on top of another, such that an input received at a hidden layer is based upon an output of an immediately adjacent hidden layer beneath the hidden layer or the input layer 108. Each hidden layer in the plurality of hidden layers 110 comprises a respective plurality of nodes (neurons), wherein each node in a hidden layer is configured to perform a respective linear or nonlinear transformation on its respective input. The input to a node can be based upon an output of a node or several nodes in an immediately adjacent layer.

The plurality of hidden layers 110 have parameters associated therewith. For example, such parameters can be weights of synapses between nodes of adjacent layers as well as weight biases. Values for such weights and weight biases can be learned during a training phase, wherein training data utilized in the training phase includes spoken utterances in a source language, which, in an exemplary embodiment, is different from the target language. As mentioned above, values for the aforementioned parameters can be learned during a training phase based upon training data in multiple source languages, wherein such training data may or may not include training data in the target language.

The MDNN 106 additionally includes a softmax layer 112 that comprises a plurality of output units. Output units in the softmax layer 112 are modeling units that are representative of phonetic elements used in the target language. For example, the modeling units in the softmax layer 112 can be representative of senones (tied triphone or quinphone states) used in speech of the target language. For example, the modeling units can be Hidden Markov Models (HMMs) or other suitable modeling units. The softmax layer 112 includes parameters with values associated therewith, wherein the values can be learned during a training phase based upon training data in the target language. With respect to the input signal, the output of the softmax layer 112 is a probability distribution over the phonetic elements (senones) used in the target language that are modeled in the softmax layer 112.

The recognition system 100 may also include a HMM 114 that is configured to compute transition probabilities between modeled phonetic units. A decoder component 116 receives the output of the HMM 114 and performs a classification with respect to the input signal based upon the output of the HMM 114. When the recognition system 100 is an ASR system, the classification can be the identification, in the target language, of a word or words in the input signal.

While the recognition system 100 has been described as being configured to recognize words in the target language, it is to be understood that in other embodiments, the recognition system 100 can be configured to recognize utterances in multiple target languages. For example, the MDNN 106 may include multiple softmax layers, one for each target language that is desirably recognized by the recognition system 100. In other embodiments, the DNN 106 may include a single softmax layer that comprises modeling units that represent phonetic elements across multiple target languages, wherein when an input signal in a particular target language is received, synapses of nodes in the uppermost hidden layer in the plurality of hidden layers 110 are selectively activated or deactivated, such that only the modeling units representative of phonetic elements used in the particular target language generate output. For instance, the recognition system 100 can optionally include a parallel language recognizer to identify a language of a spoken utterance in the input signal, and can cause synapses between nodes in the uppermost hidden layer in the plurality of hidden layers 110 and the modeling units in the softmax layer 112 to be selectively activated and/or deactivated based upon the language of the spoken utterance.

Furthermore, when the recognition system 100 is configured to recognize words in multiple target languages, the recognition system 100 may be particularly well-suited for recognizing words set forth in multiple target languages in a single spoken utterance. For example, a human attempting to set forth a phrase or sentence in her secondary language may, by accident or habit, include a word or words in her primary language. In such a mixed-language scenario, the recognition system 100, through utilization of the MDNN 106, can recognize words set forth in a single utterance in multiple languages.

Figure 2:
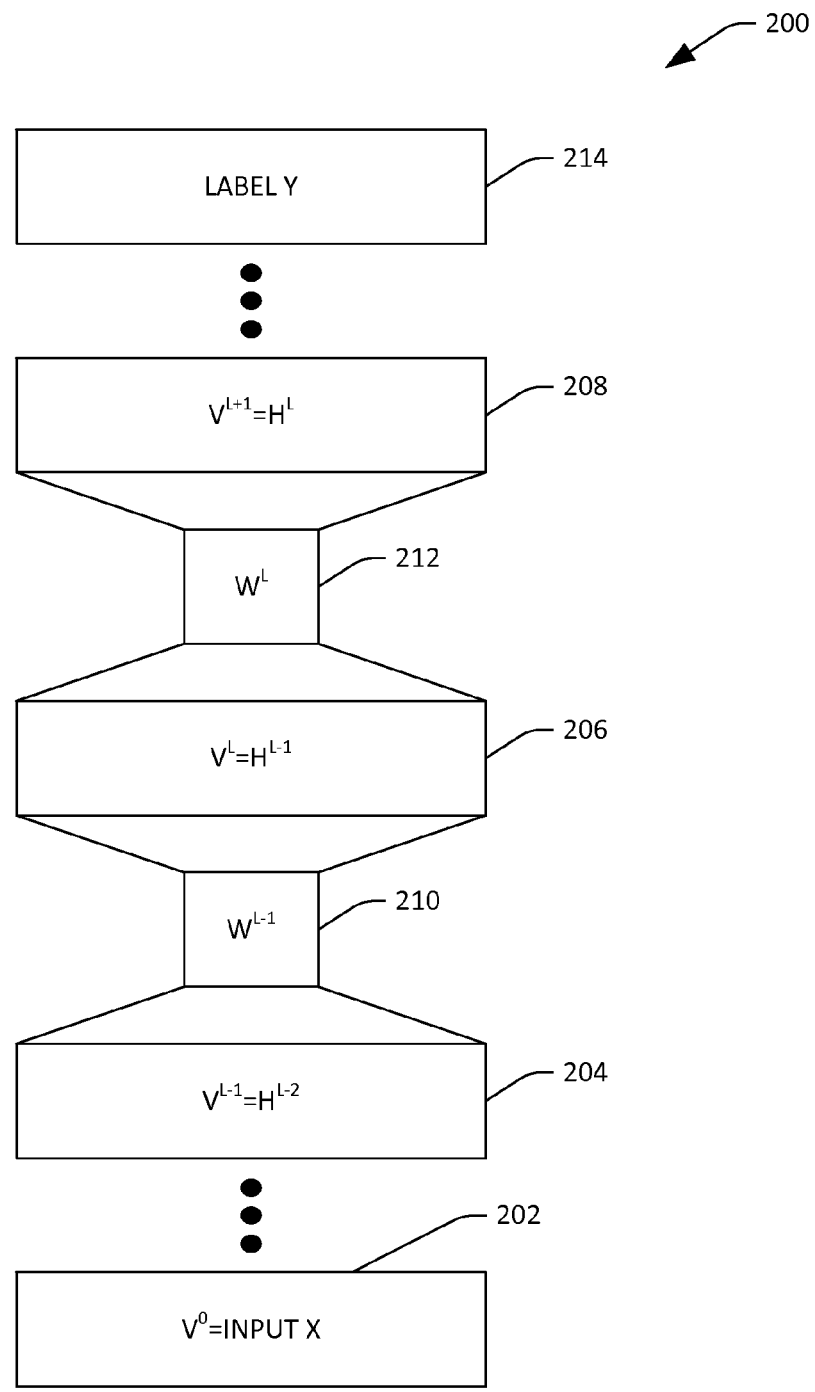
FIG. 2 illustrates an exemplary DNN.

Now turning to FIG. 2, a graphical representation of an exemplary DNN 200 is illustrated. The DNN 200 comprises an input layer 202, which captures an input feature vector $V^0$. The input is denoted in FIG. 2 by X, which is an I×1 vector. The DNN further comprises a plurality of hidden layers 204-208. Each of the hidden layers 204-208 comprises a respective plurality of hidden units (nodes), and wherein each hidden unit comprises a respective activation function. Hidden units in adjacent layers are potentially connected by way of weighted synapses, which can be collectively represented by weight matrices 210 and 212 between hidden layers. As shown, the weight matrix 210 represents weighted synapses between hidden units in the hidden layer 204 (hidden layer $H^{L-2}$) and hidden units in the hidden layer 206 (hidden layer $H^{L-1}$). Similarly, the weight matrix 212 represents weighted synapses between hidden units in the hidden layer 206 and hidden units in the hidden layer 208 (hidden layer $H^L$). A layer 214 in the DNN 200 is the output, which is determined based upon the weighted synapses and activation functions of hidden units in the DNN 200. The output is denoted in FIG. 2 as Y. During training, weights corresponding to the weight matrices 210 and 212 can be learned, as well as weight biases, using multilingual training data.

Figure 3:
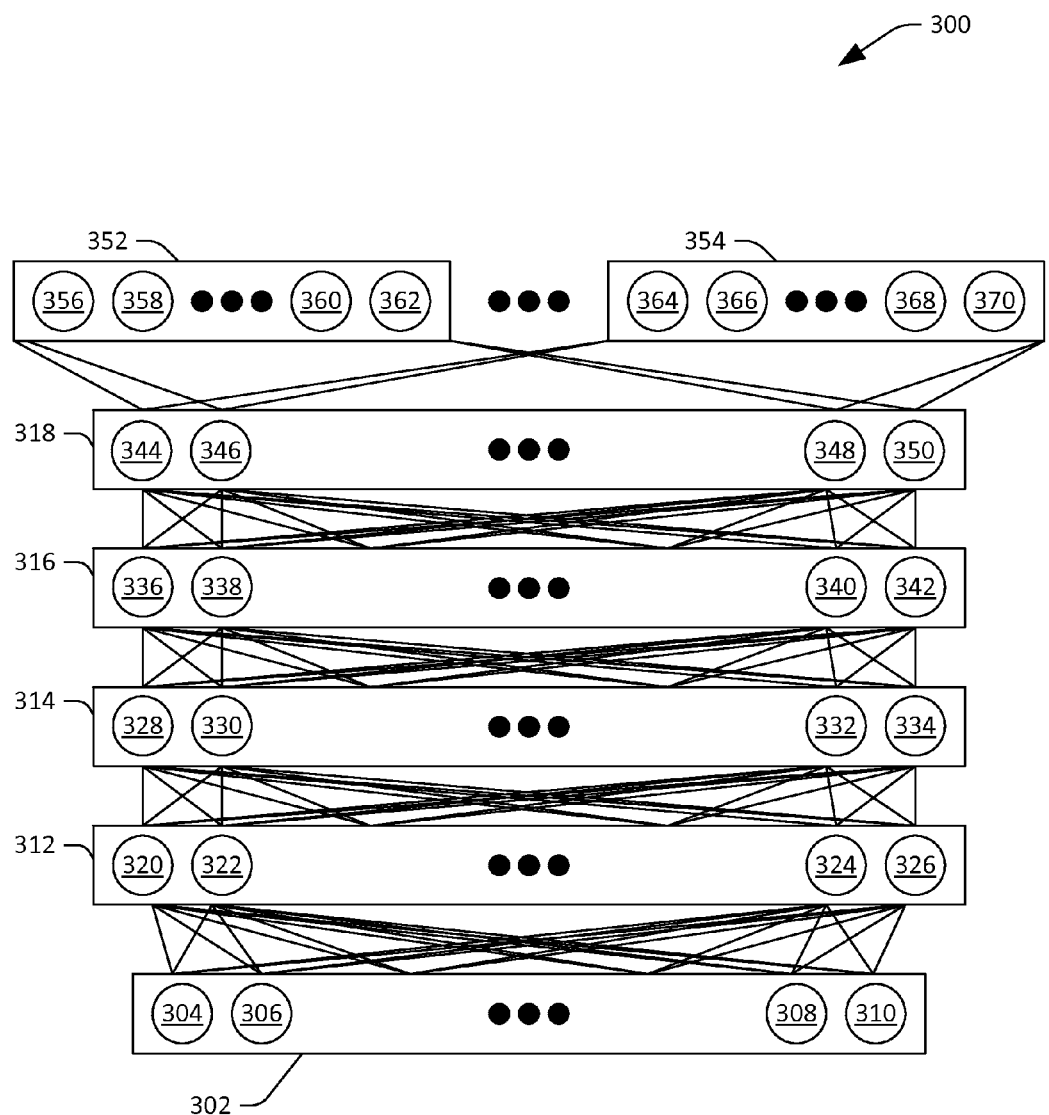
FIG. 3 illustrates an exemplary MDNN that comprises a plurality of softmax layers for a respective plurality of languages.

With reference now to FIG. 3, an exemplary MDNN 300 is illustrated. The MDNN 300 includes an input layer 302 that comprises nodes 304-310 that receive values for features extracted from an input signal. The multilingual DNN 300 further comprises a plurality of hidden layers 312-318. While the MDNN 300 is shown as including four hidden layers, it is to be understood that the MDNN 300 may include as few as three hidden layers, and as many as several hundred hidden layers. The first hidden layer 312 comprises a first plurality of nodes 320-326, the second hidden layer 314 comprises a second plurality of nodes 328-334, the third hidden layer 316 comprises a third plurality of nodes 336-342, and the fourth hidden layer 318 comprises a fourth plurality of nodes 344-350. In an exemplary embodiment, a number of nodes in each of the hidden layers 312-318 may be equivalent. In other examples, a number of nodes in the plurality of hidden layers 312-318 may be different. Furthermore, a number of nodes in each of the hidden layers 312-318 may be between one hundred nodes and ten thousand nodes. As shown, nodes in adjacent layers in the MDNN 300 can be connected by weighted synapses, such that, for instance, an input to the node 328 in the second hidden layer 314 can be a function of a weighted output of at least one node in the first hidden layer 312.

The MDNN 300 also comprises a plurality of softmax layers 352-354, wherein each softmax layer in the plurality of softmax layers 352-354 corresponds to a different respective language. The first softmax layer 352 includes a first plurality of modeling units 356-362 that respectively model a plurality of phonetic elements utilized in a language corresponding to the first softmax layer 352 (a first language). As noted above, the phonetic elements can be senones. Similarly, the Nth softmax layer 354 includes a plurality of modeling units 364-370 that are representative of phonetic elements employed in an Nth language.

In the architecture depicted in FIG. 3, the input layer 302 and the plurality of hidden layers 312-318 can be shared across all of the softmax layers 352-354, and thus can be shared across all languages with respect to which spoken words can be recognized through utilization of the MDNN 300. The input layer 302 and the plurality of hidden layers 312-318 can be considered as a universal feature transformation system. The plurality of softmax layers 352-354, however, are not shared, as each language has its own softmax layer that outputs respective posterior probabilities of the phonetic elements that are specific to a language. Note that the architecture depicted in FIG. 3 and discussed here serves only as an example. As will be shown and described with respect to FIG. 4, the architecture shown here does not preclude situations where the softmax layer is also shared across different languages (e.g., by utilizing a phoneme or senone set that is shared across languages).

As mentioned above, the input layer 302 can cover a relatively long contextual window of acoustic feature frames. Since the plurality of hidden layers 312-318 can be used for the recognition of words in many different languages, language-specific transformations, such as, HLDA are not applied in such hidden layers 312-318.

During a training phase for the MDNN 300, values for parameters of the MDNN 300 (e.g., weights of synapses and weight biases) can be learned using multilingual (multiple source language) training data simultaneously; that is, the MDNN 300 is not trained first using training data in a first source language, and then updated using training data in a second source language, and so forth. Rather, to avoid tuning the MDNN 300 to a particular source language, training data for multiple source languages can be utilized simultaneously to learn parameter values of the MDNN 300. For example, when batch training algorithms, such as L-BFGS or the Hessian-free algorithm, are used to learn parameter values for the MDNN 300, simultaneous use of training data for multiple source languages is relatively straightforward, since all of the training data can be used in each update of the MDNN 300. If, however, mini-batch training algorithms, such as the mini-batch stochastic gradient ascent (SGA) algorithm are employed, each mini-batch should be drawn from all available training data (across multiple languages). In an exemplary embodiment, this can be accomplished by randomizing the training utterance list across source languages before feeding such list into a training tool.

Further, the MDNN 300 can be pre-trained through utilization of either a supervised or unsupervised learning process. In an exemplary embodiment, an unsupervised pre-training procedure can be employed, as such pre-training may not involve language-specific softmax layers, and thus can be carried out relatively efficiently. Fine-tuning of the MDNN 300 can be undertaken through employment of a back propagation (BP) algorithm. Since, in the multilingual DNN 300, however, a different softmax layer is used for each language, the BP algorithm can be slightly adjusted. For instance, when a training sample is presented for updating the MDNN 300, only the shared hidden layers 312-318 and the language-specific softmax layer (the softmax layer for a language of the training sample) are updated, while other softmax layers are kept intact (not affected by such training) The plurality of hidden layers 312-318 act as a structural regularization to the multilingual DNN 300, and the entire multilingual DNN 300 can be considered as an example of multitask learning. After the training phase has been completed, the MDNN 300 can be employed to recognize speech in any target language represented by one of the plurality of softmax layers 352-354.

It is also to be understood that the plurality of hidden layers 312-318 of the MDNN 300 can be considered as an intelligent feature extraction module, jointly trained with data from multiple source languages. Accordingly, the plurality of hidden layers 312-318 includes rich information to distinguish phonetic classes in multiple source languages, and can be carried over to distinguish phones in a new target language (wherein learning of parameter values of the plurality of hidden layers 312-318 was not based upon training data in the new target language). It can, therefore, be ascertained that knowledge learned in the multiple hidden layers 312-318 based upon training data in multiple source languages can be employed to distinguish phones in the new target language (e.g., cross-lingual model transfer can be employed).

Cross-lingual model transfer can be undertaken as follows: the shared hidden layers 312-318 can be extracted from the MDNN 300, and a new softmax layer for the new target language can be added on top of the plurality of hidden layers 312-318. The output nodes of the softmax layer for the new target language correspond to senones utilized in the new target language. Parameter values for the hidden layers 312-318 may be fixed, and the softmax layer can be trained using training data for the new target language. If a relatively large amount of training data for the new target language is available, parameter values in the plurality of hidden layers 312-318 can be further tuned based upon such training data. Experimental results have indicated that, with respect to a target language, an ASR system that includes the MDNN 300 exhibits improved recognition accuracy for the target language relative to a recognition system that includes a DNN trained solely based upon the target language.

Figure 4:
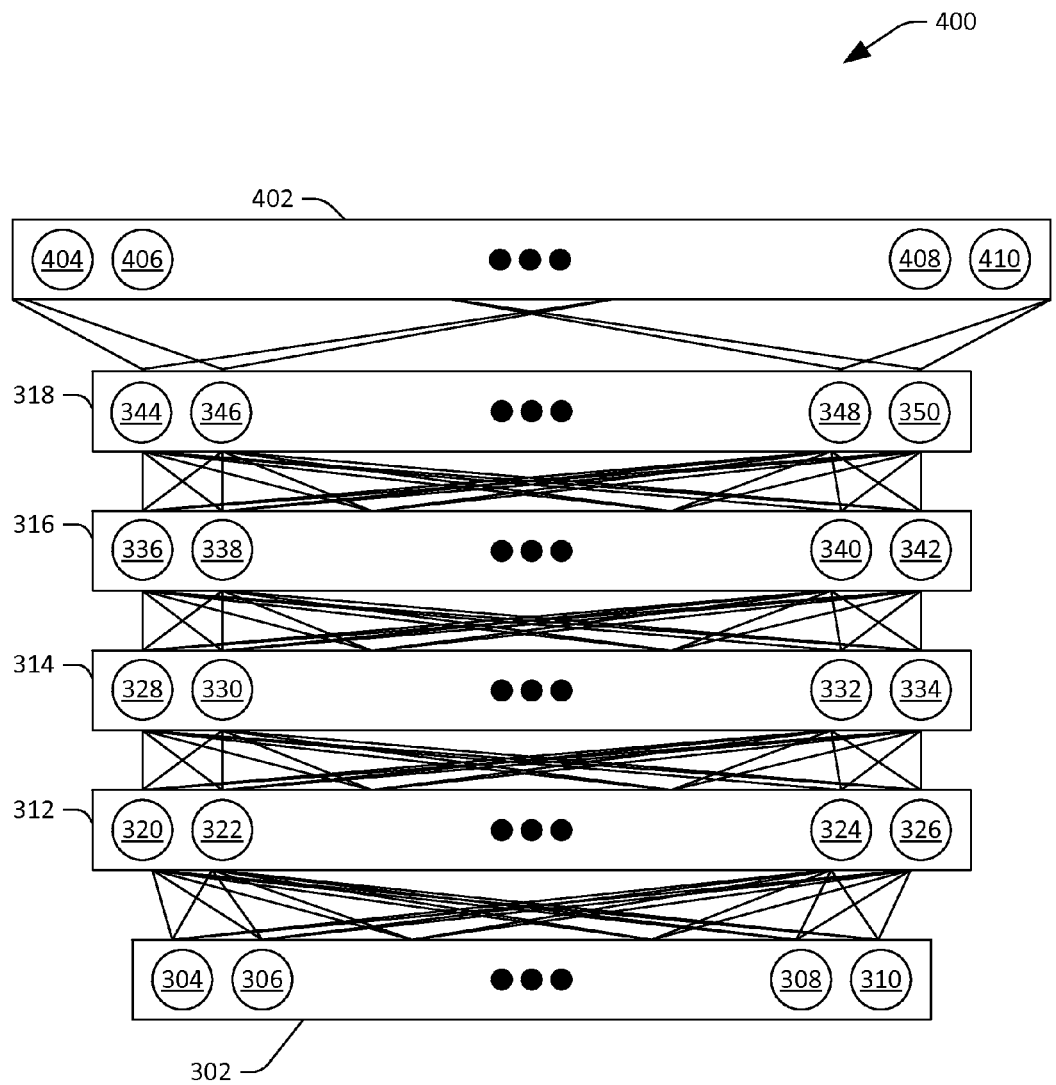
FIG. 4 illustrates an exemplary MDNN that includes a single softmax layer.

Now referring to FIG. 4, another exemplary MDNN 400 is illustrated. The MDNN 400 includes the input layer 302 and the plurality of hidden layers 314-318. Rather than including a plurality of softmax layers, the MDNN 400 includes a single softmax layer 402, which comprises a plurality of modeling units 404-410 that represent phonetic elements utilized across multiple target languages. Pursuant to an example, an ASR system that includes the MDNN 400 can be configured to recognize words spoken in a first target language and words spoken in a second target language. In such an embodiment, the softmax layer 402 may include modeling units representative of senones not used in the first target language but that are used in the second target language, and vice versa. Rather than switching between softmax layers, as described with respect to the MDNN 300 of FIG. 3, when it is determined that a captured observation corresponds to the first target language, synapse carrying input to modeling units representative of senones not used in the first target language are deactivated. Therefore, only modeling units representative of senones used in the first target language generate output. The output of the softmax layer 402, then, is a probability distribution over senones in the first target language. Similarly, when it is determined that a captured observation includes words in the second target language, synapses carrying input to modeling units representative of senones used in the second target language are activated (with appropriate weights), and synapses carrying input to modeling units representative of senones not used in the second target language are deactivated.

Figure 5:
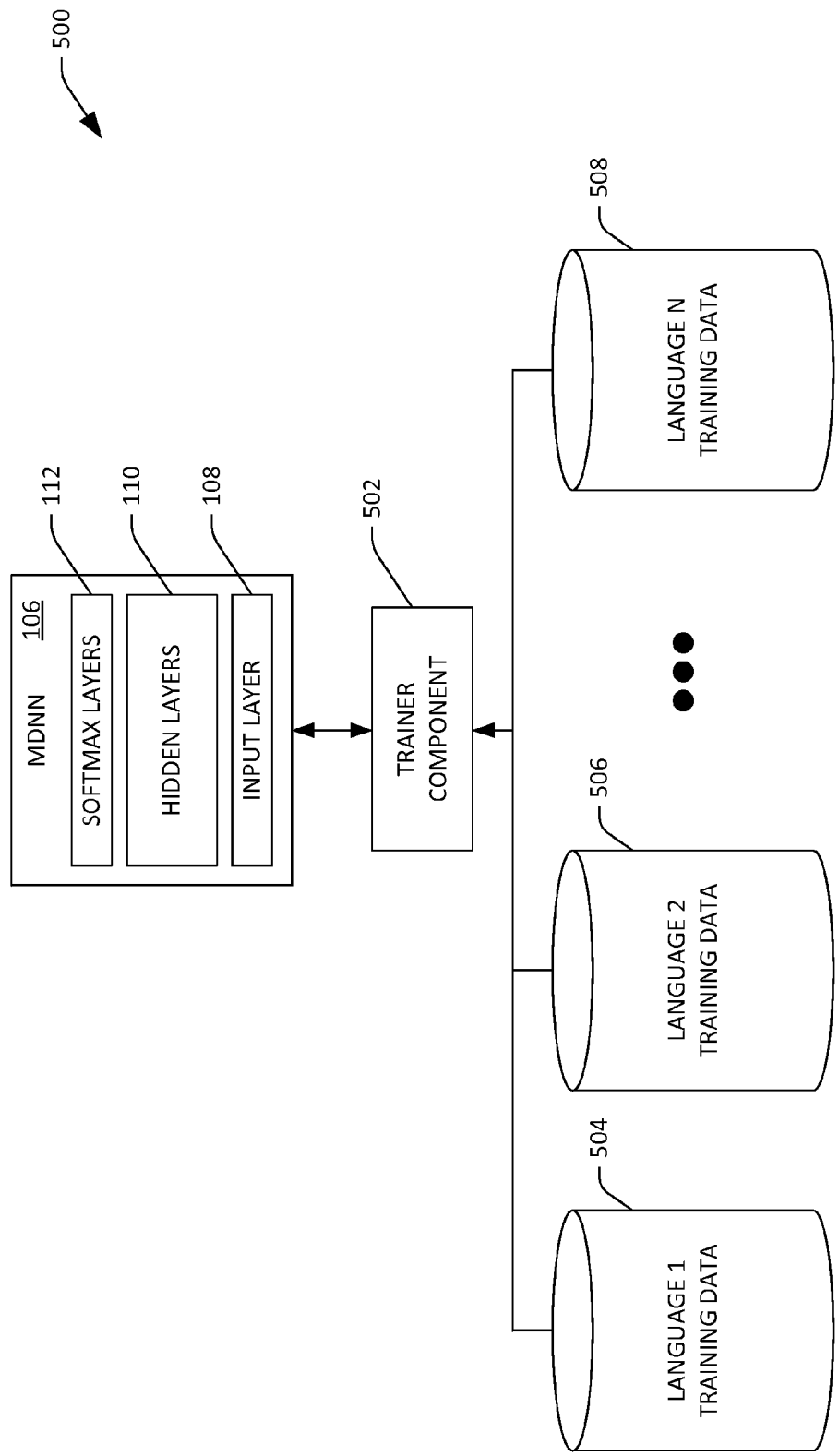
FIG. 5 is a functional block diagram of an exemplary system that facilitates learning values for parameters of a MDNN.

With reference now to FIG. 5, an exemplary system 500 for training the MDNN 106 is illustrated. The system 500 includes a trainer component 502 that receives training data in a first source language 504, training data in a second source language 506, through training data in an Nth source language 508. In an exemplary embodiment, the training data 504-508 is labeled training data, such that transcriptions for utterances in the training data 504-508 in their respective languages are available. It is contemplated, however, that some training data in the training data 504-508 may be unlabeled, such that the trainer component 502 can utilize unsupervised learning techniques when learning values for parameters of the MDNN 106.

In an exemplary embodiment, the trainer component 502 can train the MDNN 106 for all source languages represented in the training data 504-508 in a parallel fashion (simultaneously). As indicated above, the trainer component 502 can employ a batch training algorithm, such as L-BFGS or the Hessian-free algorithm, when learning values for parameters of the MDNN 106. In other embodiments, the trainer component 502 can employ a mini-batch training algorithm when learning values for parameters of the MDNN 106, such as the mini-batch SGA algorithm.

Figure 6:
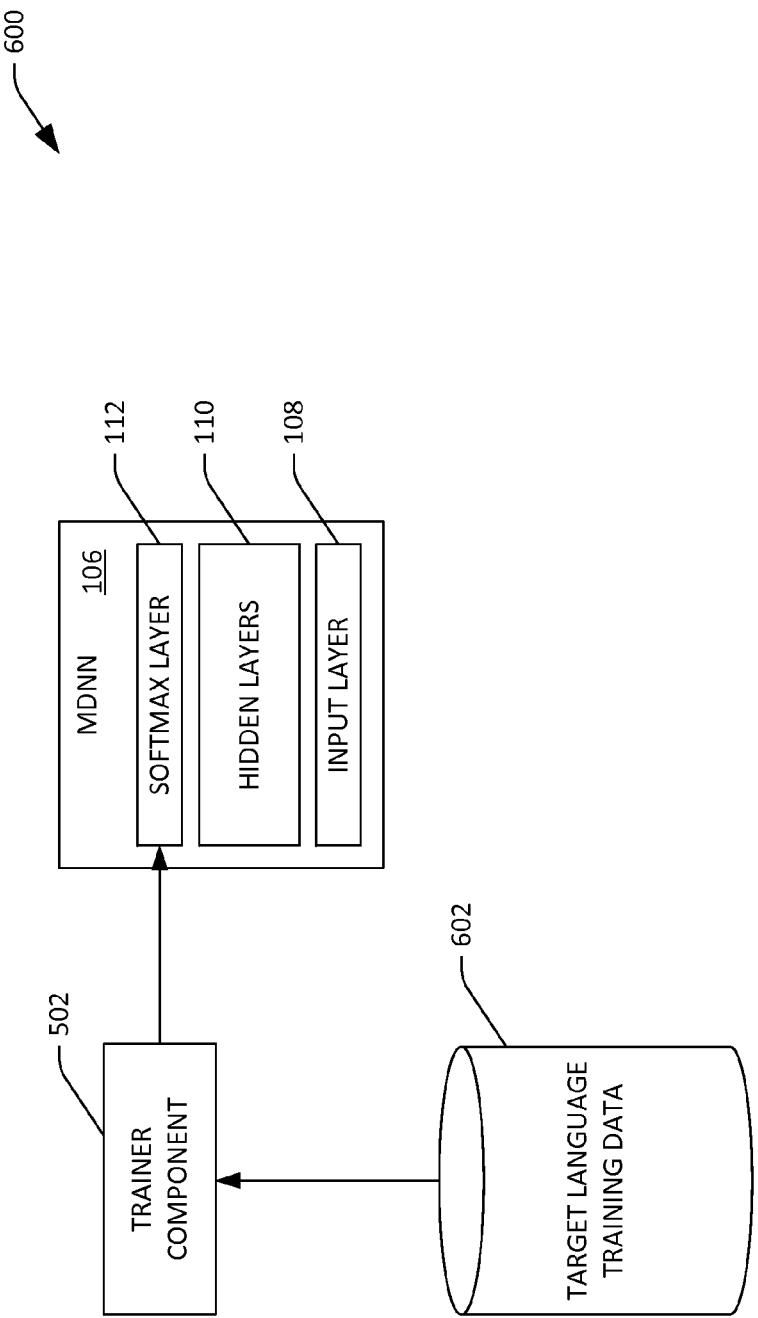
FIG. 6 is a functional block diagram of an exemplary system that facilitates learning values for parameters of a softmax layer of a MDNN.

With reference now to FIG. 6, an exemplary system 600 that facilitates updating the MDNN 106 to recognize words set forth in a new target language is illustrated. In the exemplary system 600, the trainer component 502 can receive new target language training data 602. Pursuant to an example, the trainer component 502 can cause values for parameters of the hidden layers 110 to remain fixed, and add a softmax layer corresponding to the new target language on top of the plurality of hidden layers 110 in the MDNN 106. The trainer component 502 may then use any suitable training algorithm to learn values for parameters of modeling units in the softmax layer 112 for the new target language.

With more specificity, if there is a relatively small amount of training data in the new target language training data 602, the trainer component 502 can cause the values for parameters of the hidden layers 110 to remain fixed while values for parameters of the softmax layer are learned for the new target language. Thus, values for parameters of the hidden layers 110 may be learned based upon multilingual training data that does not include training data for the new target language. If, however, the new target language training data 602 includes a relatively significant amount of training data, the trainer component 502 can also tune values for parameters of the hidden layers 110 for the new target language. For example, if there is greater than nine hours of training data in the new target language training data 602, the trainer component 502 can update the entirety of the MDNN 106. If, however, there is less than nine hours of training data in the new target language training data 106, the trainer component 502 can learn values for parameters of the softmax layer 112 for the new target language while not affecting values for parameters of the hidden layers 110.

Figure 7:
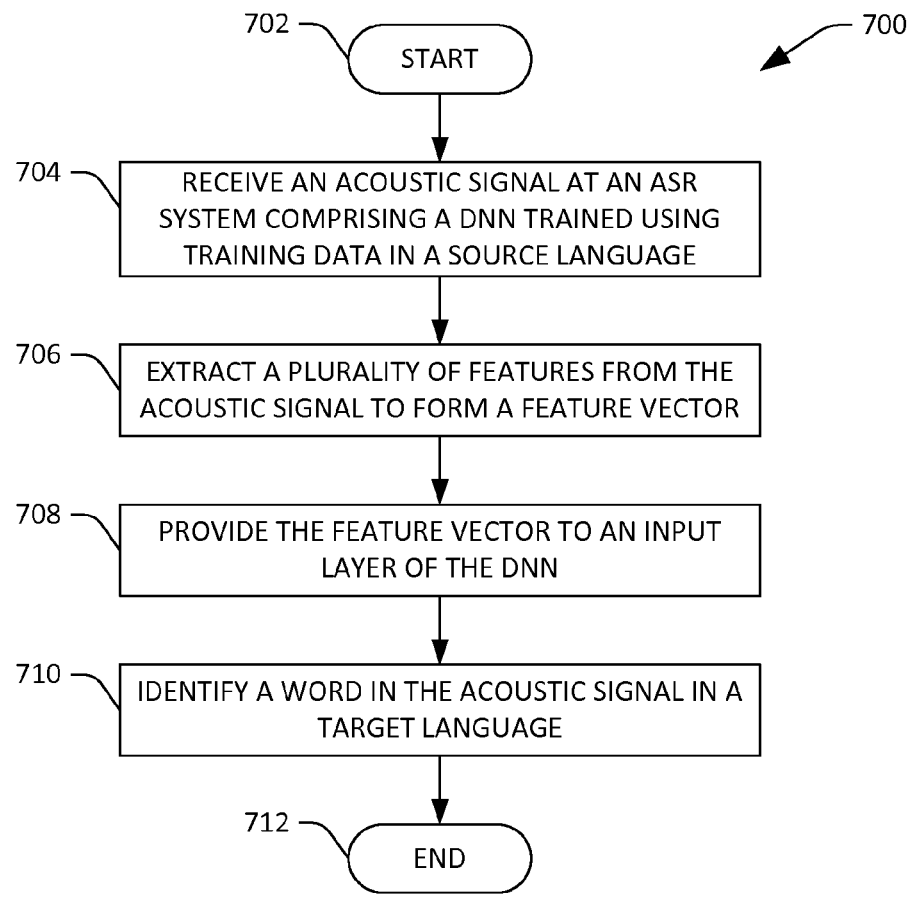
FIG. 7 is a flow diagram that illustrates an exemplary methodology for identifying a word in a captured spoken utterance through utilization of a MDNN.
Figure 8:
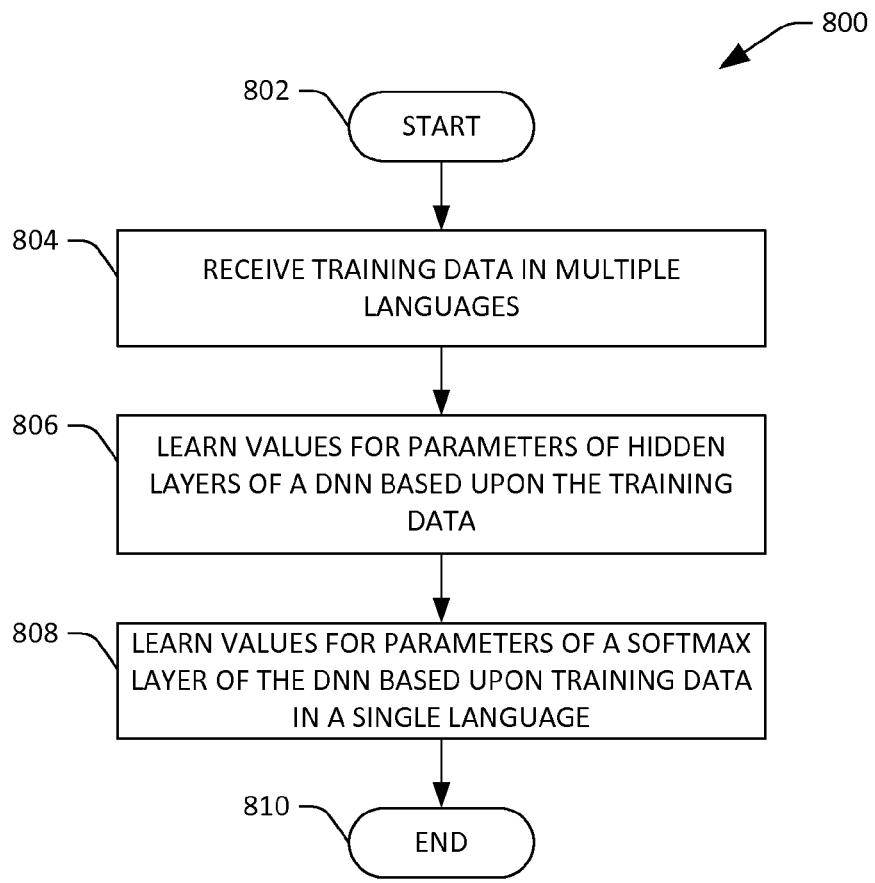
FIG. 8 is a flow diagram that illustrates an exemplary methodology for learning values of parameters of a MDNN.
Figure 9:
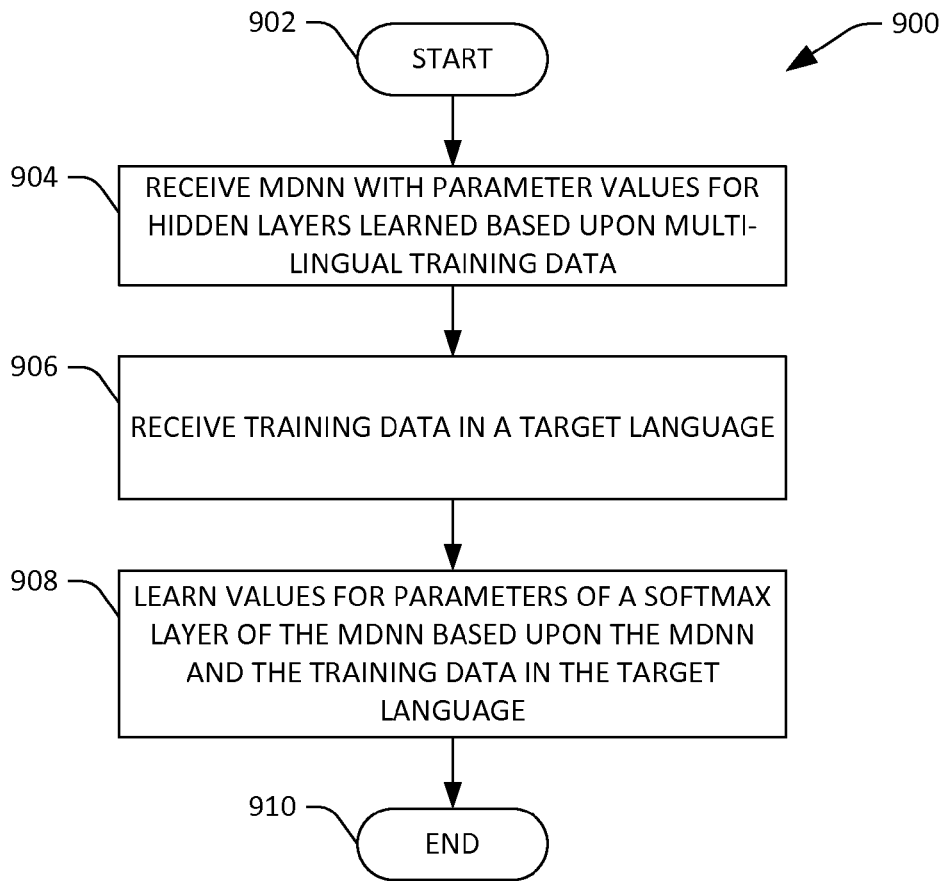
FIG. 9 is a flow diagram that illustrates an exemplary methodology for learning values of parameters of a softmax layer in a MDNN.

FIGS. 7-9 illustrate exemplary methodologies relating to training and use of MDNNs. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for identifying a word in an acoustic signal that includes an utterance in a target language is illustrated. The methodology 700 starts at 702, and 704 an acoustic signal that comprises a word in the target language is received at an ASR system. The ASR system comprises a DNN that is trained based at least in part upon training data that comprises spoken utterances in a source language (which is different from the target language). More specifically, values of parameters of hidden layers in the DNN are learned in a training phase based at least in part upon training data in the source language.

At 706, features are extracted from the acoustic signal received at 704 to form a feature vector. At 708, the feature vector is provided to an input layer of the DNN. As described above, the DNN may also include a softmax layer for the target language, such that responsive to the feature vector being provided to the input layer of the DNN, the softmax layer outputs a probability distribution over senones of the acoustic signal represented in the softmax layer. At 710, the word in the target language is identified based upon the output of the DNN. The methodology 700 completed 712.

Turning now to FIG. 8, an exemplary methodology 800 that facilitates learning values for parameters of a softmax layer of a MDNN is illustrated. The methodology 800 starts at 802, and at 804, training data in multiple different source languages is received. At 806, values for hidden layers of the MDNN are learned based upon the training data received at 804. At 808, values for parameters of a softmax layer of the MDNN are learned based upon training data in a target language. As mentioned above, the training data in the target language may or may not be included in the training data received at 804 and used for learning values for parameters of the hidden layers of the MDNN at 806. The methodology 800 completes at 810.

With reference now to FIG. 9, an exemplary methodology 900 for learning values for parameters of a softmax layer of a MDNN is illustrated. The methodology 900 starts at 902, and at 904 a MDNN is received, wherein the MDNN has parameter values for hidden layers that are learned based upon multilingual training data.

At 906, training data for a target language is received. For example, the training data for the target language may not have been used to learn the values for the parameters of the hidden layers. At 908, values for parameters of a softmax layer of the MDNN for the target language are learned based upon the MDNN received at 904 and the training data in the target language received at 906. The methodology 900 completes at 910.

Figure 10:
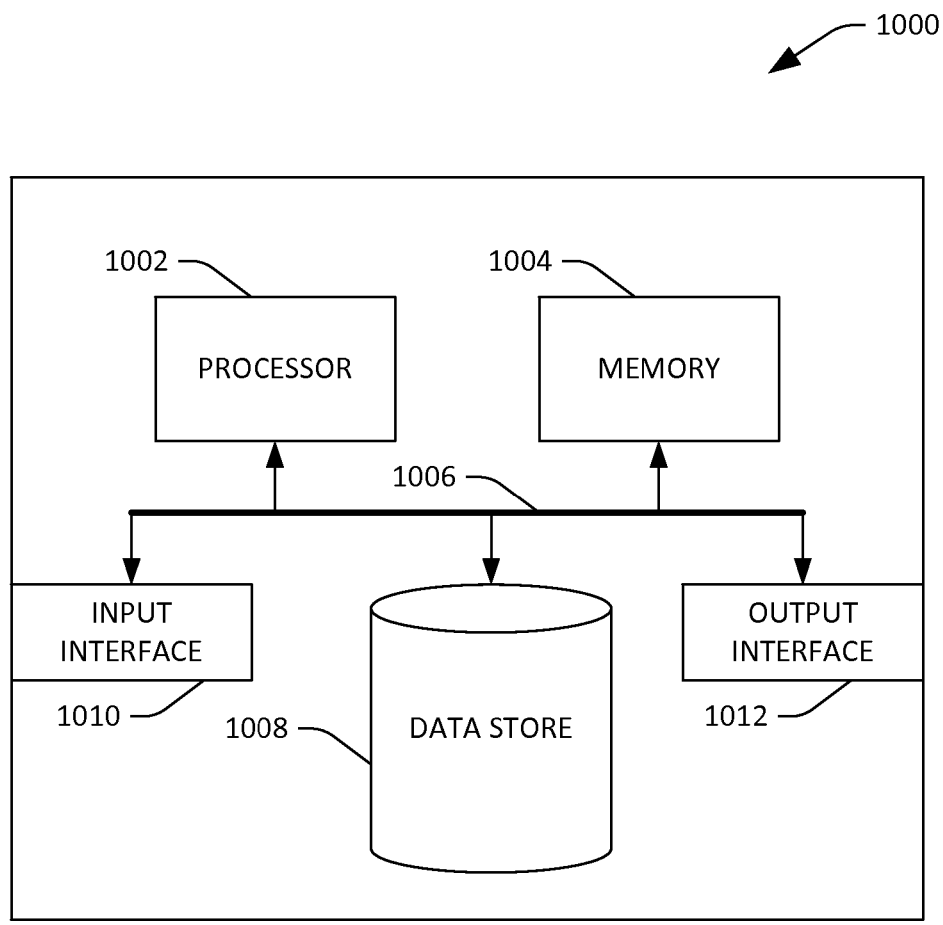
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that supports training an MDNN. By way of another example, the computing device 1000 can be used in a system that comprises an ASR system that comprises an MDNN. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store training data, an MDNN, a HMM, etc.

The computing device 1000 additionally includes a data store 1008 that is accessible by the processor 1002 by way of the system bus 1006. The data store 1008 may include executable instructions, multilingual training data, an MDNN, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    at a computing device that comprises at least one computer processor:
        receiving an acoustic signal at an automatic speech recognition (ASR) system, the ASR system configured to identify words in multiple different languages, the ASR system comprises a deep neural network (DNN), the DNN comprises an output layer that includes at least one softmax layer, the at least one softmax layer comprises output nodes, the output nodes correspond to the multiple different languages, wherein the DNN is trained based at least in part upon training data, the training data comprising spoken utterances in a source language, the acoustic signal comprising a spoken utterance that includes a word in a target language, the target language being different from the source language;
        extracting a plurality of features from the acoustic signal to form a feature vector;
        providing the feature vector to an input layer of the DNN, the DNN producing an output at the output layer responsive to being provided with the feature vector;
        identifying the word in the target language in the spoken utterance based upon the output of the DNN at the output layer; and
        performing at least one computing operation based upon the word in the target language in the spoken utterance being identified.

2. The method of claim 1, wherein the training data comprise spoken utterances in the target language.

3. The method of claim 2, wherein the spoken utterance comprises a second word in a second target language, and further comprising identifying the second word in the second target language in the spoken utterance based upon the output of the DNN at the output layer.

4. The method of claim 1, wherein the DNN comprises:
a plurality of hidden layers, wherein each hidden layer in the plurality of hidden layers comprises a respective plurality of nodes, each node configured to perform a linear or nonlinear transformation on its respective input, and wherein the at least one softmax layer comprises a first softmax layer that receives outputs of respective nodes in an uppermost layer of the plurality of hidden layers, the first softmax layer comprises a plurality of modeling units that are representative of respective senones used in the target language, wherein the first softmax layer is trained based solely upon training data in the target language.

5. The method of claim 4, wherein the at least one softmax layer further comprises a second softmax layer that receives outputs of respective nodes in the uppermost layer of the plurality of hidden layers, the second softmax layer comprising a plurality of modeling units that are representative of senones used in speech in a second target language, wherein the second softmax layer is trained based solely upon training data in the second target language.

6. The method of claim 1, wherein the DNN comprises:
a plurality of hidden layers, wherein each hidden layer in the plurality of hidden layers comprises a respective plurality of nodes, each node configured to perform a linear or nonlinear transformation on its respective input, and wherein the at least one softmax layer is a single softmax layer, the single softmax layer receives outputs of respective nodes in the uppermost layer of the plurality of hidden layers, the single softmax layer comprising a plurality of modeling units that are representative of senones used in speech in the source language and the target language, the training data comprising spoken utterances in the target language, the method further comprising:
at the computing device that comprises the at least one processor:
identifying that the spoken utterance comprises the word in the target language; and
selectively activating input synapses to the single softmax layer corresponding to senones used in the target language while failing to activate input synapses to the single softmax layer corresponding to senones not used in the target language.

7. The method of claim 1 executed in a mobile computing or a gaming device.

8. The method of claim 1, wherein the DNN comprises a plurality of hidden layers and the at least one softmax layer comprises a plurality of softmax layers, and further wherein the DNN is trained in a parallel fashion using training data for different source languages, with values of parameters of the plurality of hidden layers and the plurality of softmax layers for each source language being adjusted simultaneously, and wherein the DNN is updated to comprise a new softmax layer, where the new softmax layer corresponds to a new target language and is trained by acoustic signals comprising spoken utterances in the new target language.

9. The method of claim 1, wherein the DNN comprises a plurality of hidden layers and the at least one softmax layer includes a single softmax layer, wherein supervised learning is employed to train the DNN to learn values of parameters of the hidden layers and the single softmax layers based upon the training data.

10. The method of claim 1, wherein the DNN is trained utilizing a plurality of sets of training data, each set of training data in the plurality of sets of training data corresponding to a different respective language.

11. A computing device comprising:
at least one processor; and
memory that comprises:
a recognition system that is configured to detect words in multiple languages, the recognition system comprising:
a deep neural network (DNN) that comprises:
an input layer;
a plurality of hidden layers, each hidden layer comprising a respective plurality of nodes, each node in a hidden layer being configured to perform a linear or nonlinear transformation on output of at least one node from an adjacent layer in the DNN, the plurality of hidden layers having parameters corresponding thereto, wherein values of the parameters are based upon training data that comprises acoustic signals that include spoken utterances in a plurality of different source languages; and
at least one softmax layer that comprises modeling units that are representative of phonetic elements used in the multiple languages, the multiple languages include a target language, the at least one softmax layer having parameters corresponding thereto, wherein values of the parameters of the at least one softmax layer are based upon training data that comprises acoustic signals that include spoken utterances in the target language, the at least one softmax layer receiving outputs of nodes from an uppermost hidden layer in the DNN, wherein output of the at least one softmax layer is a probability distribution over the modeling units; and
instructions that, when executed by the at least one processor, cause the at least one processor to perform acts comprising:
receiving an acoustic signal that comprises a word in the target language;
extracting features from the acoustic signal to generate a feature vector;
providing the feature vector to the DNN; and
identifying the word in the target language based upon the probability distribution over at least a subset of the modeling units.

12. The computing device of claim 11 being a mobile telephone or a gaming device.

13. The computing device of claim 12 being a server that is accessible by way of a telephone.

14. The computing device of claim 11, wherein the at least one softmax layer comprises a plurality of softmax layers, each softmax layer in the plurality of softmax layers corresponding to a respective language in the multiple languages.

15. The computing device of claim 11, wherein the modeling units represent senones, wherein the at least one softmax layer comprises a set of the modeling units utilized in the target language, wherein a number of modeling units in the set of modeling units is less than a number of modeling units in the at least one softmax layer.

16. The computing device of claim 11, wherein the training data comprises acoustic signals that include spoken utterances in a plurality of different languages, and wherein the values of the parameters of the hidden layers are based upon the acoustic signals that include spoken utterances in the plurality of different languages.

17. The computing device of claim 16, wherein the acoustic signals that include the spoken utterances in the plurality of different source languages are used simultaneously to train the DNN, such that the values of the parameters of the hidden layers and each softmax layer in the DNN are adjusted, and wherein the DNN is updated to comprise a new softmax layer, where the new softmax layer corresponds to a new target language and is trained by acoustic signals comprising spoken utterances in the new target language.

18. The computing device of claim 11, wherein a number of hidden layers in the DNN is between three and one hundred.

19. The computing device of claim 11, wherein a number of hidden nodes in each hidden layer is between one thousand and ten thousand.

20. A computer-readable storage medium device comprising instructions that, when executed by a processor, cause the processor to perform acts, comprising:

receiving an acoustic signal that comprises a spoken utterance, the spoken utterance comprising words in a language;

recognizing that the spoken utterance corresponds to the language;

extracting features from at least one frame of the acoustic signal to form a feature vector;

providing the feature vector to an input layer of a deep neural network (DNN), the DNN comprising:

a plurality of hidden layers, each hidden layer in the plurality of hidden layers comprising a plurality of nodes, each node configured to perform a linear or nonlinear transformation on its respective input, wherein the plurality of hidden layers have parameters corresponding thereto, wherein weights of the parameters are based upon training data that includes acoustic signals, the acoustic signals comprising spoken utterances in a plurality of different source languages; and a plurality of softmax layers, each softmax layer receiving output of nodes in an uppermost hidden layer in the plurality of hidden layers, each softmax layer comprising a respective plurality of modeling units that model senones utilized in a respective target language represented by a respective softmax layer, the respective softmax layer trained based upon training data that comprises spoken utterances in a target language corresponding to the respective softmax layer;

responsive to the recognizing that the spoken utterance corresponds to the language, selecting a softmax layer from the plurality of softmax layers that corresponds to the language; and recognizing the words in the spoken utterance based upon an output of the softmax layer selected from amongst the plurality of softmax layers.

\* \* \* \* \*